United States Patent
Muraguchi et al.

(10) Patent No.: US 10,968,975 B2
(45) Date of Patent: Apr. 6, 2021

(54) HYDRAULIC DAMPING DEVICE

(71) Applicant: Showa Corporation, Gyoda (JP)

(72) Inventors: Nobuyuki Muraguchi, Gyoda (JP); Satomi Hojo, Gyoda (JP); Gota Nakano, Gyoda (JP)

(73) Assignee: Showa Corporation, Gyoda (JP)

( * ) Notice: Subject to any disclaimer, the term of this patent is extended or adjusted under 35 U.S.C. 154(b) by 70 days.

(21) Appl. No.: 16/483,244

(22) PCT Filed: Mar. 8, 2017

(86) PCT No.: PCT/JP2017/009317
§ 371 (c)(1),
(2) Date: Aug. 2, 2019

(87) PCT Pub. No.: WO2018/158964
PCT Pub. Date: Sep. 7, 2018

(65) Prior Publication Data
US 2019/0368568 A1   Dec. 5, 2019

(30) Foreign Application Priority Data
Mar. 3, 2017 (JP) .............................. JP2017-040477

(51) Int. Cl.
*F16F 9/00* (2006.01)
*F16F 9/32* (2006.01)
*F16F 9/18* (2006.01)

(52) U.S. Cl.
CPC ............ *F16F 9/3214* (2013.01); *F16F 9/185* (2013.01); *F16F 9/3235* (2013.01); *F16F 9/3257* (2013.01); *F16F 2222/12* (2013.01)

(58) Field of Classification Search
CPC .. F16F 9/062; F16F 9/066; F16F 9/185; F16F 9/187; F16F 9/325; F16F 9/3257; F16F 9/3235
(Continued)

(56) References Cited

U.S. PATENT DOCUMENTS 5,901,820 A * 5/1999 Kashiwagi ............... F16F 9/46
188/266.6
9,856,939 B2 * 1/2018 Matsumoto ........... F16F 9/3415
(Continued)

FOREIGN PATENT DOCUMENTS

JP         07-217694 A     8/1995
JP       2014-029201 A     2/2014
(Continued)

OTHER PUBLICATIONS

International Search Report dated May 23, 2017 for the corresponding International Patent Application No. PCT/JP2017/009317.

*Primary Examiner* — Nicholas J Lane
(74) *Attorney, Agent, or Firm* — Leason Ellis LLP

(57) ABSTRACT

This hydraulic damping device comprises a cylinder for containing oil; a reservoir chamber R which is provided in the outer part of the cylinder and in which liquid accumulates; a piston provided so as to be axially movable within the cylinder and dividing the space within the cylinder into a first oil chamber and a second oil chamber, which contain oil; a baffle member provided as a separate element from the cylinder, the baffle member having a body which is provided in the reservoir chamber R, and also having a protrusion which protrudes from the body, the baffle member preventing the waving of the surface of oil in the reservoir chamber R; and a limiting section (first section to be held) provided to the baffle member and limiting the movement of the baffle member on both one side and the other side in the axial direction.

4 Claims, 8 Drawing Sheets

(58) Field of Classification Search
USPC .................................... 188/315, 318, 322.2
See application file for complete search history.

(56) References Cited

U.S. PATENT DOCUMENTS

| | | | | |
|---|---|---|---|---|
| 10,704,641 | B2* | 7/2020 | Roessle | F16F 9/50 |
| 2005/0067240 | A1* | 3/2005 | Holiviers | F16F 9/062 |
| | | | | 188/315 |
| 2012/0073920 | A1* | 3/2012 | Yamasaki | F16F 9/34 |
| | | | | 188/315 |
| 2014/0291086 | A1 | 10/2014 | Suzuki et al. | |
| 2014/0291089 | A1* | 10/2014 | Konakai | F16F 9/34 |
| | | | | 188/314 |
| 2016/0017951 | A1 | 1/2016 | Matsumoto et al. | |
| 2017/0299009 | A1* | 10/2017 | Murakami | F16F 9/3235 |

FOREIGN PATENT DOCUMENTS

| | | |
|---|---|---|
| JP | 2016-023661 A | 2/2016 |
| JP | 2016-044776 A | 4/2016 |

* cited by examiner

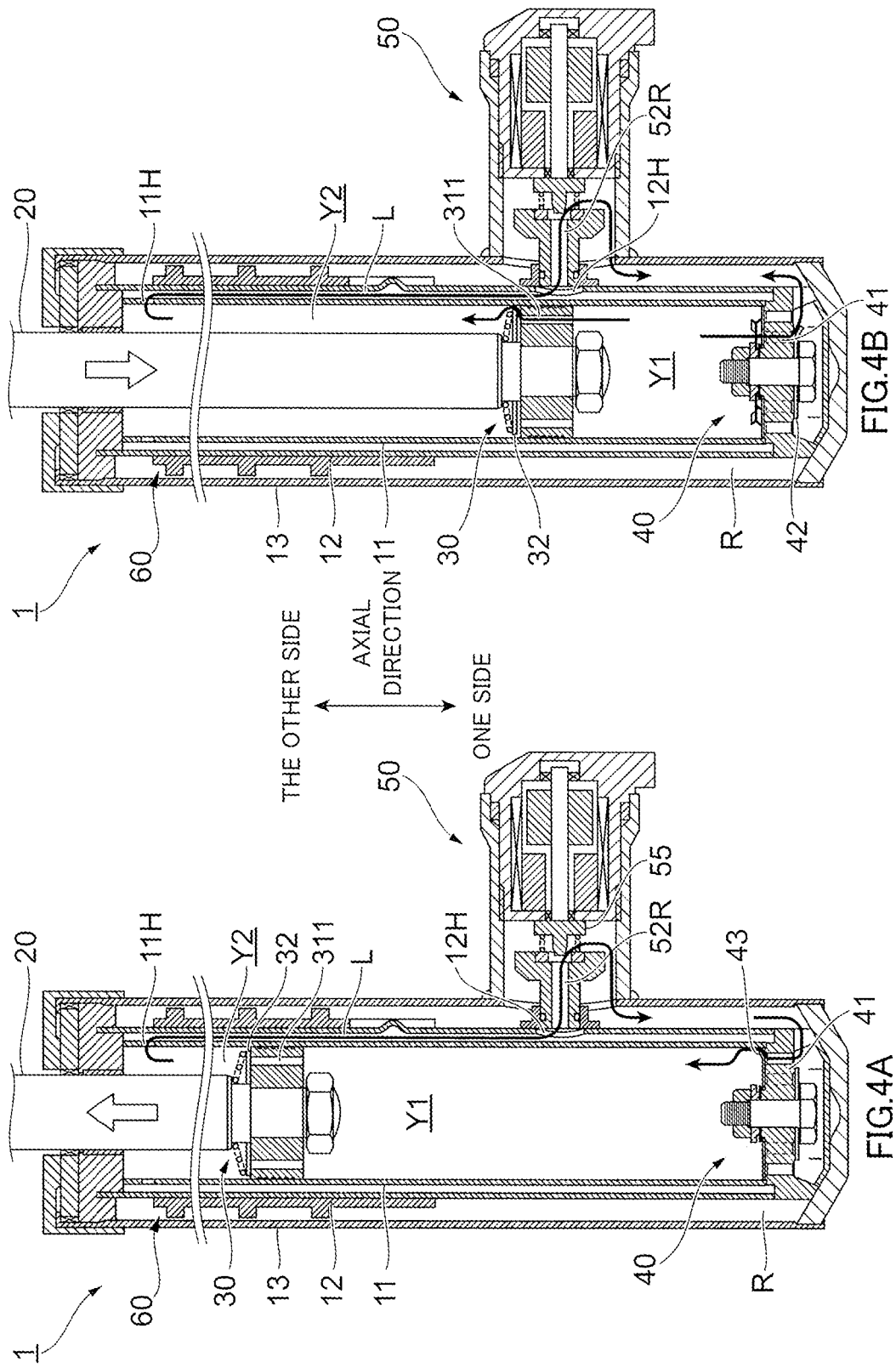

HYDRAULIC DAMPING DEVICE

CROSS-REFERENCE TO RELATED PATENT APPLICATIONS

This application is a U.S. National Phase Application under 35 U.S.C. § 371 of International Patent Application No. PCT/JP2017/009,317, filed Mar. 8, 2017, and claims the benefit of Japanese Patent Application No. 2017-040477, filed Mar. 3, 2017, all of which are incorporated herein by reference in their entirety. The International Application was published in Japanese on Sep. 7, 2018 as International Publication No. WO/2018/158964 under PCT Article 21(2).

FIELD OF THE INVENTION

The present invention relates to a hydraulic damping device.

BACKGROUND OF THE INVENTION

For example, the hydraulic damping device disclosed in Japanese Patent Application Laid-Open Publication No. 2014-029201 includes a protrusion in a reservoir chamber or a protrusion on an outer cylinder projecting from its inner surface toward an inner cylinder, in order to prevent ruffle of the liquid surface and formation of bubbles. The protrusion is formed over the entire or almost entire circumference of the outer surface of the inner cylinder or the inner surface of the outer cylinder. When viewed from the direction perpendicular to the outer surface or the inner surface, the protrusion assumes a wave-like shape.

Technical Problem

For example, when a liquid surface in the liquid reservoir ruffles, it causes bubbles to mix into the liquid, which makes it difficult to generate a desired damping force. One countermeasure to this would be to provide a disturbance prevention member to prevent disturbance of the liquid surface in the liquid reservoir. However, when such a disturbance prevention member is a separate component from the cylinder, the disturbance prevention member may move during operation of the hydraulic damping device. This may hinder the disturbance prevention member from reliably preventing ruffle of the liquid surface, which may result in a failure to prevent mixing of bubbles into the liquid.

An object of the present invention is to reliably prevent mixing of bubbles into the liquid in the hydraulic damping device.

SUMMARY OF THE INVENTION

Solution to Problem

With this object in view, the present invention is a hydraulic damping device including: a cylinder unit storing liquid; a liquid reservoir outside the cylinder unit, the liquid reservoir retaining liquid; a partitioning unit configured to move in an axial direction inside the cylinder unit, the partitioning unit partitioning a space inside the cylinder unit into a first oil chamber and a second oil chamber each storing liquid; a disturbance prevention member separate from the cylinder unit, the disturbance prevention member including a main body located in the liquid reservoir and a protrusion protruding from the main body, the disturbance prevention member being configured to prevent disturbance of a liquid surface of liquid within the liquid reservoir; and a restricting part provided to the disturbance prevention member, the restricting part being configured to restrict the disturbance prevention member from moving to both one side and the other side in the axial direction.

Advantageous Effects of Invention

According to the present invention, it is possible to reliably prevent bubbles from mixing into the liquid in the hydraulic damping device.

BRIEF DESCRIPTION OF THE DRAWINGS

FIGS. 4A and 4B are explanatory diagrams of how the hydraulic damper of the first embodiment works.

DETAILED DESCRIPTION OF THE INVENTION

Embodiments of the present invention will be described below in detail with reference to the attached drawings.

First Embodiment

Structure and Function of the Hydraulic Damper 1

Figure 1:
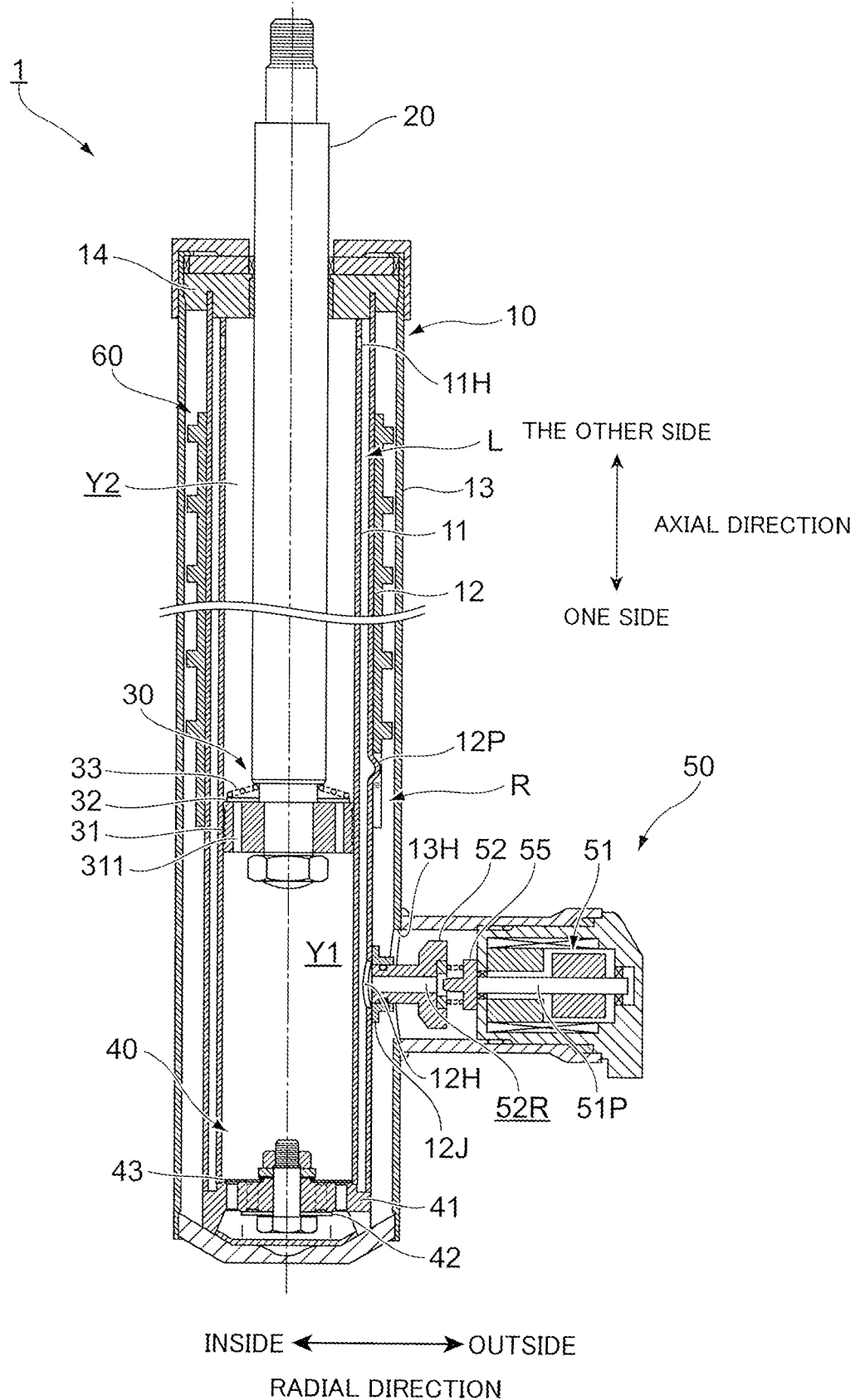
FIG. 1 is an entire view of a hydraulic damper of the first embodiment.

FIG. 1 is an entire view of the hydraulic damper 1 of the first embodiment.

As shown in FIG. 1, the hydraulic damper 1 (an example of the hydraulic damping device) includes a cylinder unit 10 storing oil (an example of the liquid), and a rod 20. One end of the rod 20 is inserted into the cylinder unit 10 such that the rod 20 can slide within the cylinder unit 10, and the other end of the rod 20 protrudes from the cylinder unit 10. The hydraulic damper 1 further includes a piston unit 30 disposed at the one end of the rod 20, a bottom valve unit 40 disposed at one end of the cylinder unit 10, a damping force changer 50 disposed outside of the cylinder unit 10 in the radial direction. The hydraulic damper 1 further includes a baffle member 60.

In the following description, the longitudinal direction of the hydraulic damper 1 shown in FIG. 1 is referred to as an "axial direction". The lower side in the axial direction is referred to as "one side", and the upper side of the hydraulic damper 1 is referred to as "the other side". Also, the lateral direction of the hydraulic damper 1 shown in FIG. 1 is referred to as a "radial direction". Further, the side radially closer to the centerline is referred to as an "inside in the radial direction", and the side radially away from the centerline is referred to as an "outside in the radial direction".

Further, the rotational direction of the hydraulic damper 1 about the axial direction is referred to as a "circumferential direction".

Structure and Function of the Cylinder Unit 10

The cylinder unit 10 includes a cylinder 11 (an example of the first cylinder), an outer cylinder body 12 (an example of the second cylinder) disposed at the outside of the cylinder 11 in the radial direction, and a damper case 13 (an example of the third cylinder) disposed at the outside of the outer cylinder body 12 in the radial direction. The cylinder unit 10 further includes a rod guide 14 at its other side end.

The cylinder 11 has a cylindrical shape and includes a cylinder opening 11H at the other side. The cylinder 11 is contacted by the piston unit 30 such that the piston unit 30 is movable in the axial direction.

The outer cylinder body 12 forms a communication path L between the outer cylinder body 12 and the cylinder 11. Also, the outer cylinder body 12 includes an outer cylinder body opening 12H and a solenoid connecting part 12J (an example of the connecting part) at positions facing the damping force changer 50. The solenoid connecting part 12J includes an oil flow path, and protrudes to the outside in the radial direction for connection with the damping force changer 50.

The outer cylinder body 12 further includes a holding part 12P at the other side relative to the solenoid connecting part 12J. The holding part 12P protrudes to the outside in the radial direction. In the present embodiment, one (single) holding part 12P is provided.

In the present embodiment, during manufacture of the outer cylinder body 12, a punching tool is pressed to the cylindrical outer cylinder body 12 from the inside in the radial direction of the outer cylinder body 12. This forms the outer cylinder body opening 12H and the holding part 12P in one process.

The damper case 13 forms a reservoir chamber R between the damper case 13 and the outer cylinder body 12. The reservoir chamber R retains oil. Along with the movement of the rod 20 relative to the cylinder 11, the reservoir chamber R (an example of the liquid reservoir) absorbs oil in the cylinder 11 (the first oil chamber Y1) or supplies oil into the cylinder 11 (the first oil chamber Y1). Further, the reservoir chamber R retains oil flowing out of the damping force changer 50. The damper case 13 includes a case opening 13H at a position facing the damping force changer 50.

The rod guide 14 closes the other side ends of the cylinder 11, the outer cylinder body 12, and the damper case 13. Further, the rod guide 14 supports the rod 20 on the inside in the radial direction such that the rod 20 can slide in the axial direction.

Structure and Function of the Rod 20

The rod 20 is a rod-like member extending in the axial direction. The rod 20 connects to the piston unit 30 at the one side. Also, the rod 20 connects to a vehicle body at the other side via a coupling member or the like (not shown in the figure).

Structure and Function of the Piston Unit 30

The piston unit 30 (an example of the partitioning unit) includes a piston body 31 having multiple piston oil ports 311, a piston valve 32 opening and closing the other side of the piston oil ports 311, a spring 33 interposed between the piston valve 32 and the one side end of the rod 20. The piston unit 30 partitions the oil chamber within the cylinder 11 into the first oil chamber Y1 (an example of the first liquid chamber) and the second oil chamber Y2 (an example of the second liquid chamber).

Structure and Function of the Bottom Valve Unit 40

The bottom valve unit 40 includes a valve seat 41, a damping valve 42 at the one side of the valve seat 41, and a check valve 43 at the other side of the valve seat 41. The bottom valve unit 40 provides a partition between the first oil chamber Y1 and the reservoir chamber R.

Structure and Function of the Damping Force Changer 50

The damping force changer 50 (an example of the damping force generator) includes a solenoid unit 51, a connecting channel member 52, and a solenoid valve 55.

The solenoid unit 51 advances or retracts a plunger 51P based on control by a controller (not shown in the figure).

The connecting channel member 52 is a substantially cylindrical member having a connecting channel 52R inside thereof.

The solenoid valve 55 changes a cross-sectional area of oil flow within the connecting channel 52R by moving the position of the solenoid valve 55 relative to the connecting channel member 52. Thus, the solenoid valve 55 throttles the flow of oil within the connecting channel 52R.

In the first embodiment, damping force in the hydraulic damper 1 is mainly generated by throttling of the oil flow by the damping force changer 50.

Structure and Function of the Baffle Member 60

Figure 2:
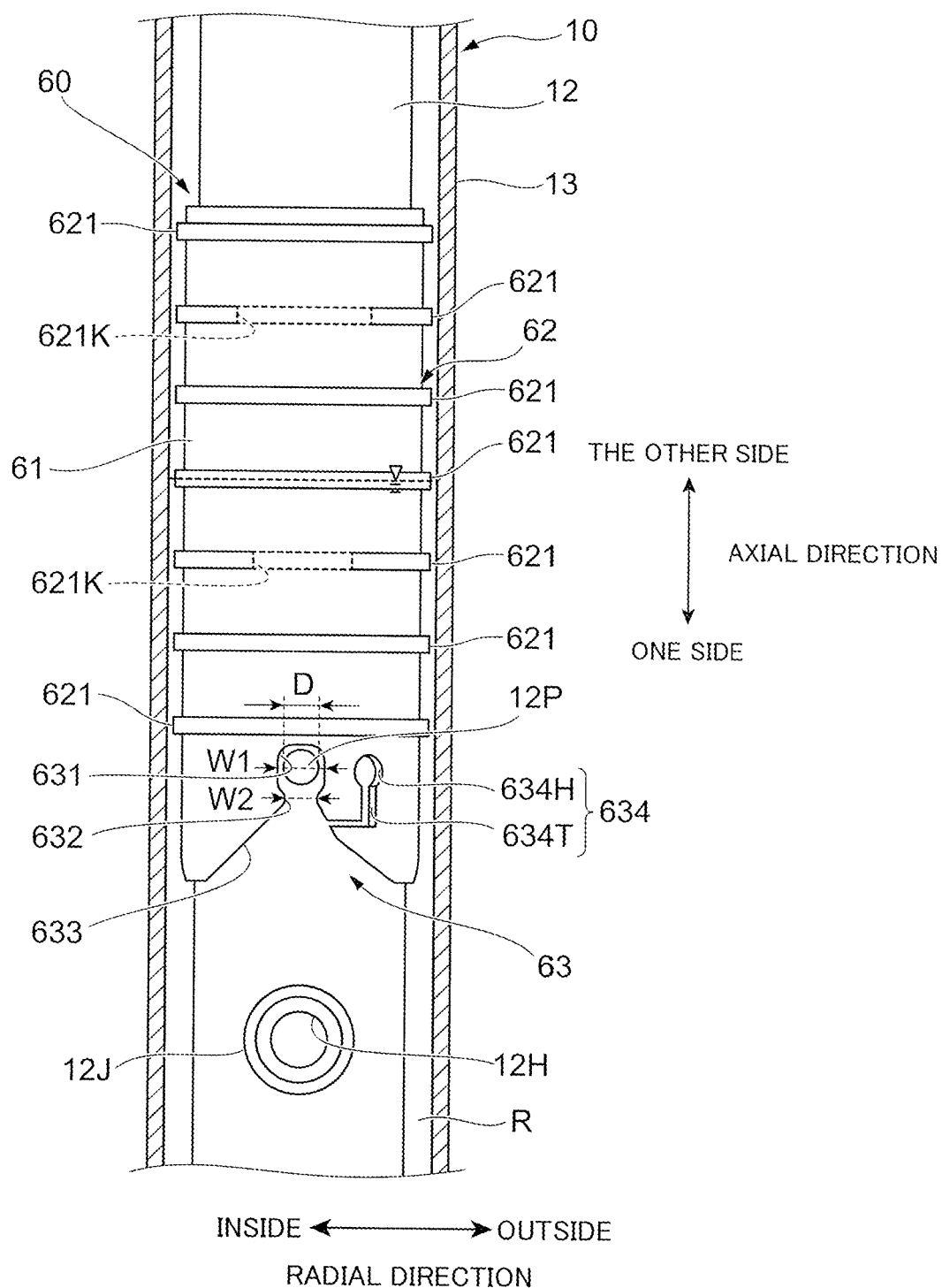
FIG. 2 is an entire view of a baffle member of the first embodiment.

FIG. 2 is an entire view of the baffle member 60 of the first embodiment.

Figure 3A:
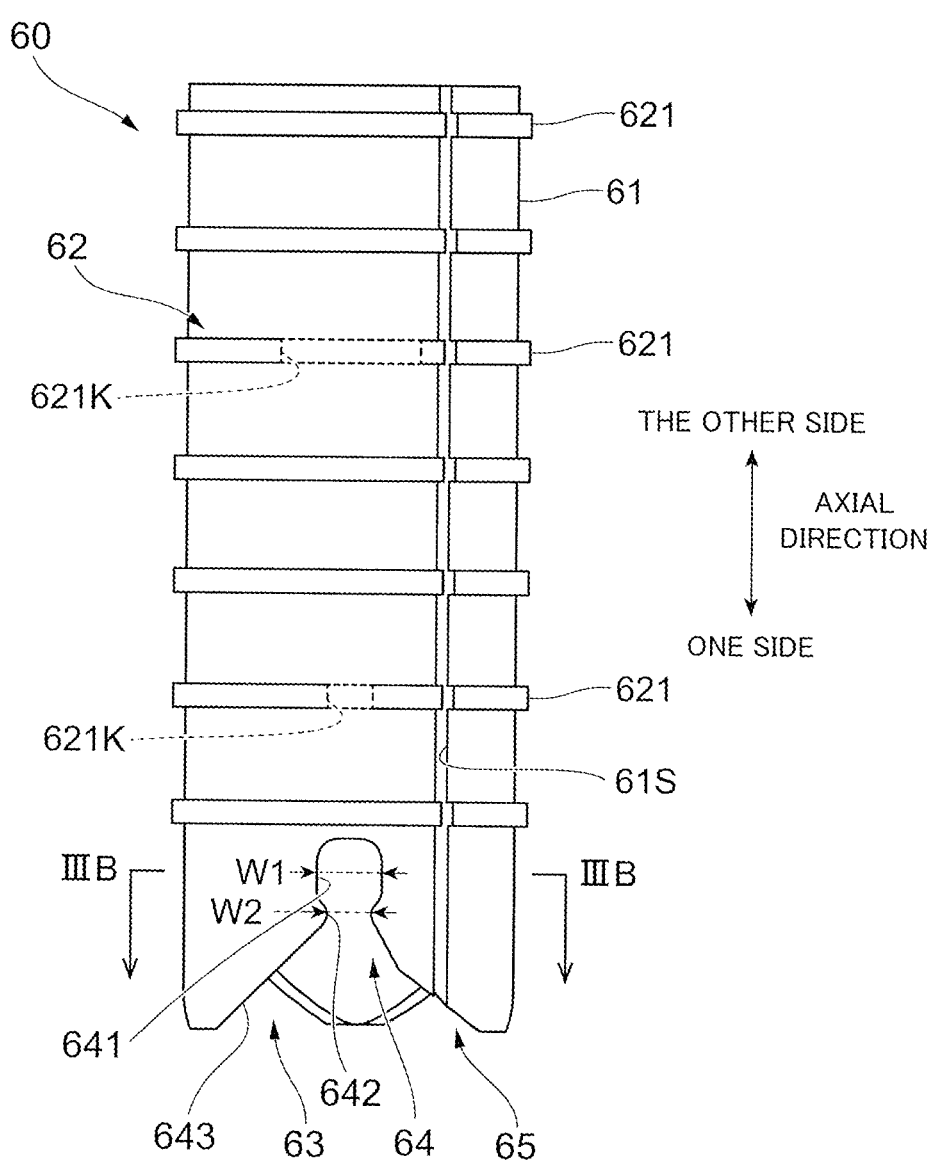
FIGS. 3A and 3B are explanatory diagrams of the baffle member of the first embodiment.
Figure 3B:
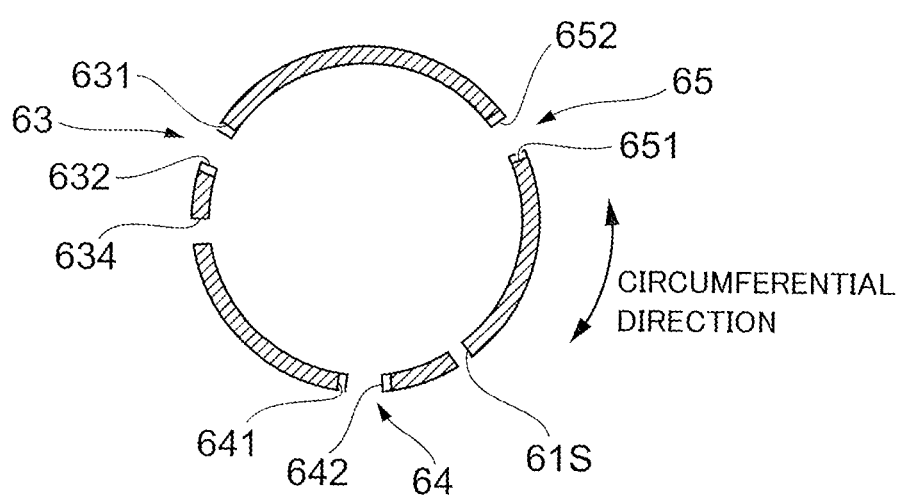

FIGS. 3A and 3B are explanatory diagrams of the baffle member 60 of the first embodiment. FIG. 3A is a side view of the baffle member 60, and FIG. 3B is a cross-sectional view of the baffle member 60 taken along the line IIIB-IIIB in FIG. 3A.

As shown in FIG. 2, the baffle member 60 (an example of the disturbance prevention member) is a substantially cylindrical member. The baffle member 60 may be made of synthetic resin, for example.

The baffle member 60 includes a main body 61 and a disturbance prevention part 62 disposed at the outside of the main body 61 in the radial direction. The baffle member 60 further includes a first held part 63, a second held part 64 (see FIGS. 3A and 3B), and a third held part 65 (see FIGS. 3A and 3B) at the one side. The baffle member 60 extends in the axial direction.

The first held part 63, the second held part 64, and the third held part 65 of the baffle member 60 of the first embodiment each serve as an example of the restricting part.

The baffle member 60 is a separate component from the outer cylinder body 12, so that the baffle member 60 can be attached to and detached from the outer cylinder body 12. In the present embodiment, the baffle member 60 is inserted in between the outer cylinder body 12 and the damper case 13 and thereby attached to the outer cylinder body 12.

Main Body 61

The main body 61 has an inner diameter substantially equal to an outer diameter of the outer cylinder body 12.

Also, the main body 61 has an outer diameter smaller than an inner diameter of the damper case 13.

As shown in FIG. 3A, the main body 61 includes a slit 61S extending in the axial direction. The slit 61S divides the main body 61 in the circumferential direction of the main body 61.

Disturbance Prevention Part 62

As shown in FIG. 2, the disturbance prevention part 62 is disposed such that its substantially intermediate position in the axial direction coincides with a liquid level of oil in 1G state (the state where a stationary force acts on the hydraulic damper 1 with a vehicle equipped with the hydraulic damper 1 in normal ground contact). The disturbance prevention part 62 prevents ruffle (disturbance) of oil in the reservoir chamber R.

As shown in FIGS. 2 and 3A, the disturbance prevention part 62 includes multiple (seven in the first embodiment) protrusions 621 that protrude from the outer surface of the main body 61 to the outside in the radial direction. In the first embodiment, the protrusions 621 are arranged at substantially equal intervals in the axial direction.

The protrusion 621 closest to the other side is located at a position corresponding to an oil level at the maximum compression of the hydraulic damper 1. Also, the protrusion 621 closest to the one side is located at a position corresponding to an oil level at the maximum extension of the hydraulic damper 1.

The baffle member 60 of the first embodiment 1 is structured such that at least one protrusion 621 remains within the oil during changes in the liquid level of oil due to advance and retraction of the rod 20. This structure is true of the baffle members of the other embodiments described later.

The outer diameter of each protrusion 621 is slightly smaller than an inner diameter of the damper case 13. This allows the oil to flow slightly between the disturbance prevention part 62 and the damper case 13 in the axial direction.

The protrusions 621 may include cutouts 621K as shown by broken lines in FIGS. 2 and 3A.

In this case, the cutouts 621K are formed in the respective protrusions 621 except for those closest to the one side and closest to the other side.

Further, each of the cutouts 621K has a different width. Specifically, the cutouts 621K of the protrusions 621 closer to the other side have a larger width than those of the protrusions 621 closer to the one side. This allows the oil to gradually fall down to the one side when, for example, the oil level rises to the other side of the disturbance prevention part 62 and then descends.

Further, the cutouts 621K of two adjacent protrusions 621 do not face each other in the axial direction. That is, two adjacent protrusions 621 are placed so that their cutouts 621K are displaced from each other in the circumferential direction. In this way, the oil may detour in the circumferential direction while flowing through the baffle member 60.

First Held Part 63

As shown in FIG. 2, the first held part 63 includes a first opening 631, a first neck part 632 at the one side of the first opening 631, a first guide part 633 at the one side of the first neck part 632, and a deformation permission part 634 at a different position from the first neck part 632 in the circumferential direction.

The first opening 631 is a substantially round opening. The first opening 631 has a circumferential width W1 that is slightly larger than an outer diameter D of the holding part 12P. In a state where the baffle member 60 is attached to the outer cylinder body 12, the first opening 631 restricts the baffle member 60 from moving to the one side.

Also, in the state where the baffle member 60 is attached to the outer cylinder body 12, the first opening 631 restricts the baffle member 60 from moving in the circumferential direction.

The first neck part 632 has a circumferential width W2 that is smaller than the outer diameter D of the holding part 12P. In the state where the baffle member 60 is attached to the outer cylinder body 12, the first neck part 632 restricts the baffle member 60 from moving to the other side relative to the outer cylinder body 12.

The first guide part 633 of the present embodiment has a tapered shape. That is, the first guide part 633 is opened such that its width gradually narrows toward the first opening 631. The first guide part 633 (an example of the guide part) guides the first opening 631 to the holding part 12P to align the first opening 631 with the holding part 12P.

The deformation permission part 634 includes an L-shaped groove 634T and a round opening 634H at an end of the groove 634T. The deformation permission part 634 (an example of the deformation permission part) permits deformation of the baffle member 60 when the baffle member 60 is attached to the outer cylinder body 12 and the first neck part 632 widens in the circumferential direction.

Second Held Part 64

As shown in FIG. 3A, the second held part 64 includes a second opening 641, a second neck part 642 at the one side of the second opening 641, and a second guide part 643 at the one side of the second neck part 642.

The second opening 641 is a substantially round opening. The second opening 641 has a circumferential width W1 that is slightly larger than the outer diameter D (see FIG. 2) of the holding part 12P. In the state where the baffle member 60 is attached to the outer cylinder body 12, the second opening 641 restricts the baffle member 60 from moving to the one side relative to the outer cylinder body 12.

Also, in the state where the baffle member 60 is attached to the outer cylinder body 12, the second opening 641 restricts the baffle member 60 from moving in the circumferential direction.

The second neck part 642 has a circumferential width W2 that is smaller than the width of the holding part 12P. In the state where the baffle member 60 is attached to the outer cylinder body 12, the second neck part 642 restricts the baffle member 60 from moving to the other side.

The second guide part 643 of the first embodiment has a substantially triangle shape. That is, the second guide part 643 is opened such that its width gradually narrows toward the second opening 641. The second guide part 643 guides the second opening 641 to the holding part 12P to align the second opening 641 with the holding part 12P.

Third Held Part 65

As shown in FIG. 3B, the third held part 65 includes a third opening 651, a third neck part 652, and a third guide part (not shown in the figure).

The basic structure of the third held part 65 is the same as that of the second held part 64.

As shown in FIG. 3B, the baffle member 60 of the first embodiment includes the slit 61S between the second held part 64 and the third held part 65 in the circumferential direction. Thus, the slit 61S (an example of the deformation permission part) permits deformation of the baffle member 60 when the second held part 64 is held by the holding part 12P, or when the third held part 65 is held by the holding part 12P.

In attaching the baffle member 60, the baffle member 60 is inserted in between the outer cylinder body 12 and the damper case 13 from the other side of the cylinder unit 10. During this work, the structure of the device makes it difficult for an operator to confirm the position of the holding part 12P, which is located on the one side. However, the baffle member 60 of the first embodiment includes multiple held parts (the first held part 63, the second held part 64, and the third held part 65). This allows for easy assembly because the operator can insert the baffle member 60 such that any one of the held parts is held by the holding part 12P.

With the above configuration, the baffle member 60 can be positioned by the first held part 63, for example. Thus, the baffle member 60 of the first embodiment reliably prevents ruffle of the liquid surface, which, in turn, prevents mixing of bubbles in the liquid.

Operation of the Hydraulic Damper 1

FIGS. 4A and 4B are explanatory diagrams of how the hydraulic damper 1 of the first embodiment works. FIG. 4A depicts oil flow during extension of the hydraulic damper 1, and FIG. 4B depicts oil flow during compression of the hydraulic damper 1.

First, an explanation will be given of operation of the hydraulic damper 1 during its extension.

As shown in FIG. 4A, during extension of the hydraulic damper 1, the rod 20 moves to the other side relative to the cylinder 11. At this time, the piston valve 32 continues to close the piston oil ports 311. Further, the movement of the piston unit 30 to the other side reduces the volume of the second oil chamber Y2. As a result, the oil in the second oil chamber Y2 flows out through the cylinder opening 11H into the communication path L.

Then, the oil goes through the communication path L, the outer cylinder body opening 12H, and the connecting channel 52R to flow into the damping force changer 50. In the damping force changer 50, the oil flow within the connecting channel 52R is throttled by the solenoid valve 55. This throttling of the oil flow by the solenoid valve 55 generates a damping force. Thereafter, the oil flows out into the reservoir chamber R.

Also, pressure inside the first oil chamber Y1 becomes relatively lower than that inside the reservoir chamber R. For this reason, oil within the reservoir chamber R flows into a channel formed in the valve seat 41 of the bottom valve unit 40. The oil then flows into the first oil chamber Y1.

Then, an explanation will be given of operation of the hydraulic damper 1 during its compression.

As shown in FIG. 4B, during compression of the hydraulic damper 1, the rod 20 moves to the one side relative to the cylinder 11. In the piston unit 30, pressure difference between the first oil chamber Y1 and the second oil chamber Y2 causes the piston valve 32 to open the piston oil ports 311. Thus, the oil within the first oil chamber Y1 flows out through the piston oil ports 311 into the second oil chamber Y2. Here, the rod 20 is present within the second oil chamber Y2. For this reason, the oil flowing from the first oil chamber Y1 into the second oil chamber Y2 is excessive in the amount equal to the volume of the rod 20 within the second oil chamber Y2. Accordingly, the oil in the amount equal to the volume of the rod 20 within the second oil chamber Y2 flows out through the cylinder opening 11H into the communication path L.

Then, the oil goes through the communication path L, the outer cylinder body opening 12H, and the connecting channel 52R to flow into the damping force changer 50. The oil flow within the damping force changer 50 is the same as that during extension of the hydraulic damper 1 as described above.

Also, as a result of the rod 20 moving to the one side relative to the cylinder 11, the oil within the first oil chamber Y1 flows into the channel formed in the valve seat 41 of the bottom valve unit 40. Then, the oil opens the damping valve 42 of the bottom valve unit 40 to flow out into the reservoir chamber R.

To adjust the damping force by the damping force changer 50, the solenoid valve 55 is controlled by the solenoid unit 51 (see FIG. 1). Specifically, distance between the solenoid valve 55 and the connecting channel member 52 is changed by the solenoid unit 51. As the distance between the solenoid valve 55 and the connecting channel member 52 narrows, the oil flow resistance increases, producing a larger damping force. On the other hand, as the distance between the solenoid valve 55 and the connecting channel member 52 widens, the oil flow resistance decreases, producing a smaller damping force.

Second Embodiment

Figure 5:
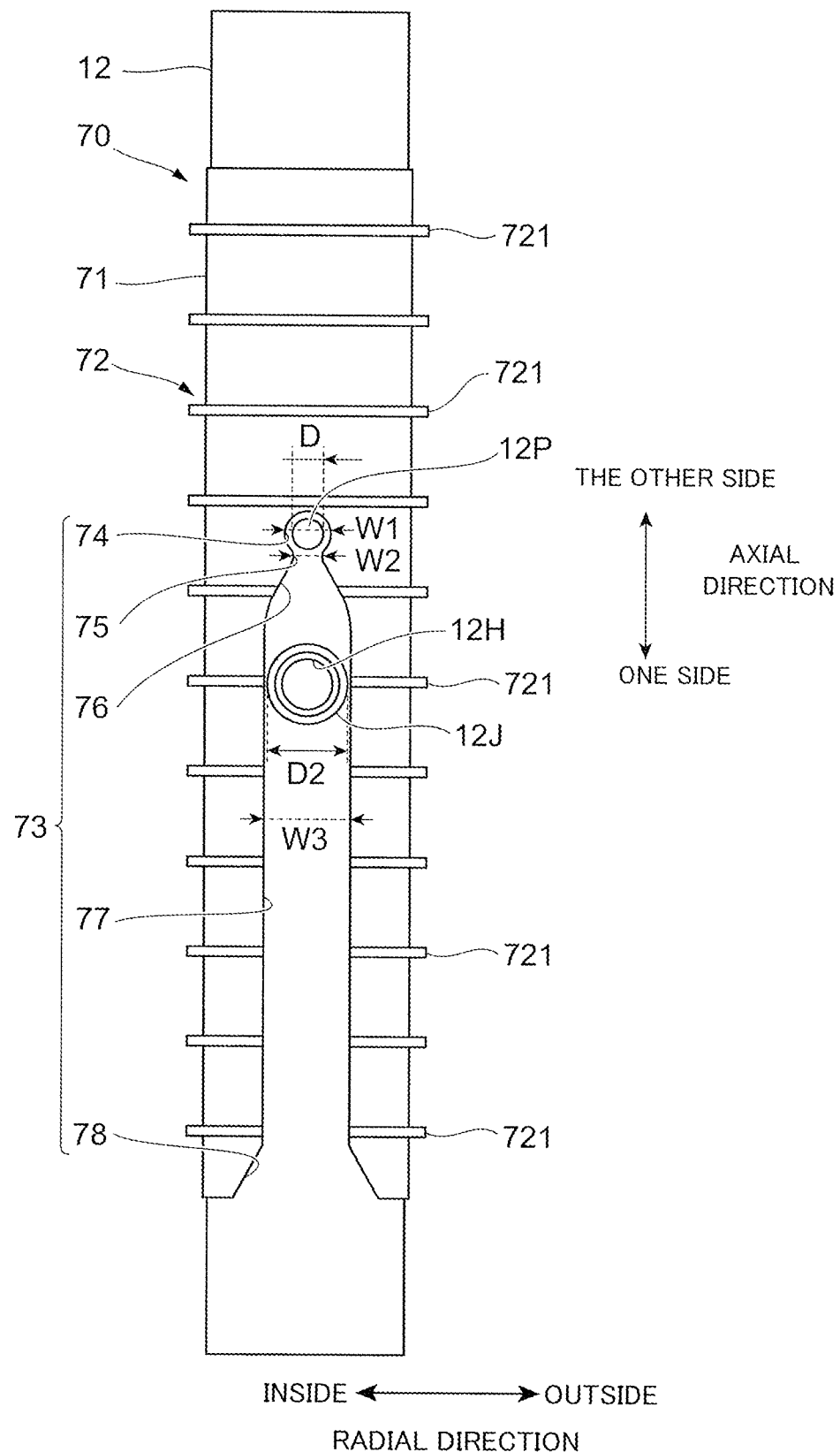
FIG. 5 is an explanatory diagram of a baffle member of the second embodiment.

FIG. 5 is an explanatory diagram of a baffle member 70 of the second embodiment.

An explanation will be given of the hydraulic damper 1 of the second embodiment. A difference of the hydraulic damper 1 of the second embodiment from those of the other embodiments lies in the structure of the baffle member 70.

In the explanation of the second embodiment, similar components to those in the first embodiment are denoted by the same reference numerals, and detailed description thereof will be omitted.

As shown in FIG. 5, the baffle member 70 (an example of the disturbance prevention member) includes a main body 71, an disturbance prevention part 72 on the outer surface of the main body 71, and a held part 73 formed at the one side.

Main Body 71

The main body 71 has an inner diameter substantially equal to the outer diameter of the outer cylinder body 12. Also, the main body 71 has an outer diameter smaller than the inner diameter of the damper case 13 (see FIG. 1). Further, in the second embodiment, the main body 71 of the baffle member 70 is elongated to the one side (lower side) past the solenoid connecting part 12J.

Further, the main body 71 includes a slit (not shown in the figure) extending in the axial direction. The slit has the same structure as that of the slit 61S in the first embodiment. The slit divides the main body 71 in the circumferential direction of the main body 71.

Disturbance Prevention Part 72

The disturbance prevention part 72 includes multiple protrusions 721 that protrude from the outer surface of the main body 71 to the outside in the radial direction. The disturbance prevention part 72 prevents ruffle of the oil surface within the reservoir chamber R.

The basic structure of the disturbance prevention part 72 is the same as that of the disturbance prevention part 62 (protrusions 621) in the first embodiment.

Held Part 73

The held part 73 includes an opening 74, a neck part 75 at the one side of the opening 74, a first guide part 76 at the one side of the neck part 75, a straight part 77 at the one side of the first guide part 76, and a second guide part 78 at the one side of the straight part 77.

The opening 74 is a substantially round opening. The opening 74 has a circumferential width W1 that is slightly larger than the outer diameter D of the holding part 12P. In the state where the baffle member 70 is attached to the outer cylinder body 12, the opening 74 restricts the baffle member 70 from moving to the one side.

Also, in the state where the baffle member 70 is attached to the outer cylinder body 12, the opening 74 restricts the baffle member 70 from moving in the circumferential direction.

The neck part 75 has a circumferential width W2 that is smaller than the outer diameter D of the holding part 12P. In the state where the baffle member 70 is attached to the outer cylinder body 12, the neck part 75 restricts the baffle member 70 from moving to the other side.

In the second embodiment, the opening 74 and the neck part 75 restrict the baffle member 70 from moving to both the one side and the other side in the axial direction.

The first guide part 76 has a tapered shape. That is, the first guide part 76 is opened such that its width gradually narrows toward the opening 74. The first guide part 76 guides the opening 74 to the holding part 12P to fit the holding part 12P into the opening 74.

The straight part 77 is an axial groove having a predetermined width. The straight part 77 has a circumferential width W3 that is slightly larger than an outer diameter D2 of the solenoid connecting part 12J. When the baffle member 70 is attached to the outer cylinder body 12, the straight part 77 allows the baffle member 70 to be inserted to the one side (lower side) past the solenoid connecting part 12J.

The second guide part 78 has a tapered shape. In other words, the second guide part 78 is opened so that its width gradually narrows toward the straight part 77. The second guide part 78 guides the straight part 77 toward the solenoid connecting part 12J to fit the straight part 77 into the solenoid connecting part 12J.

With the above configuration, the baffle member 70 can be positioned by the held part 73, for example. Thus, the baffle member 70 of the second embodiment reliably prevents ruffle of the liquid surface, which, in turn, prevents mixing of bubbles in the liquid.

Third Embodiment

Figure 6:
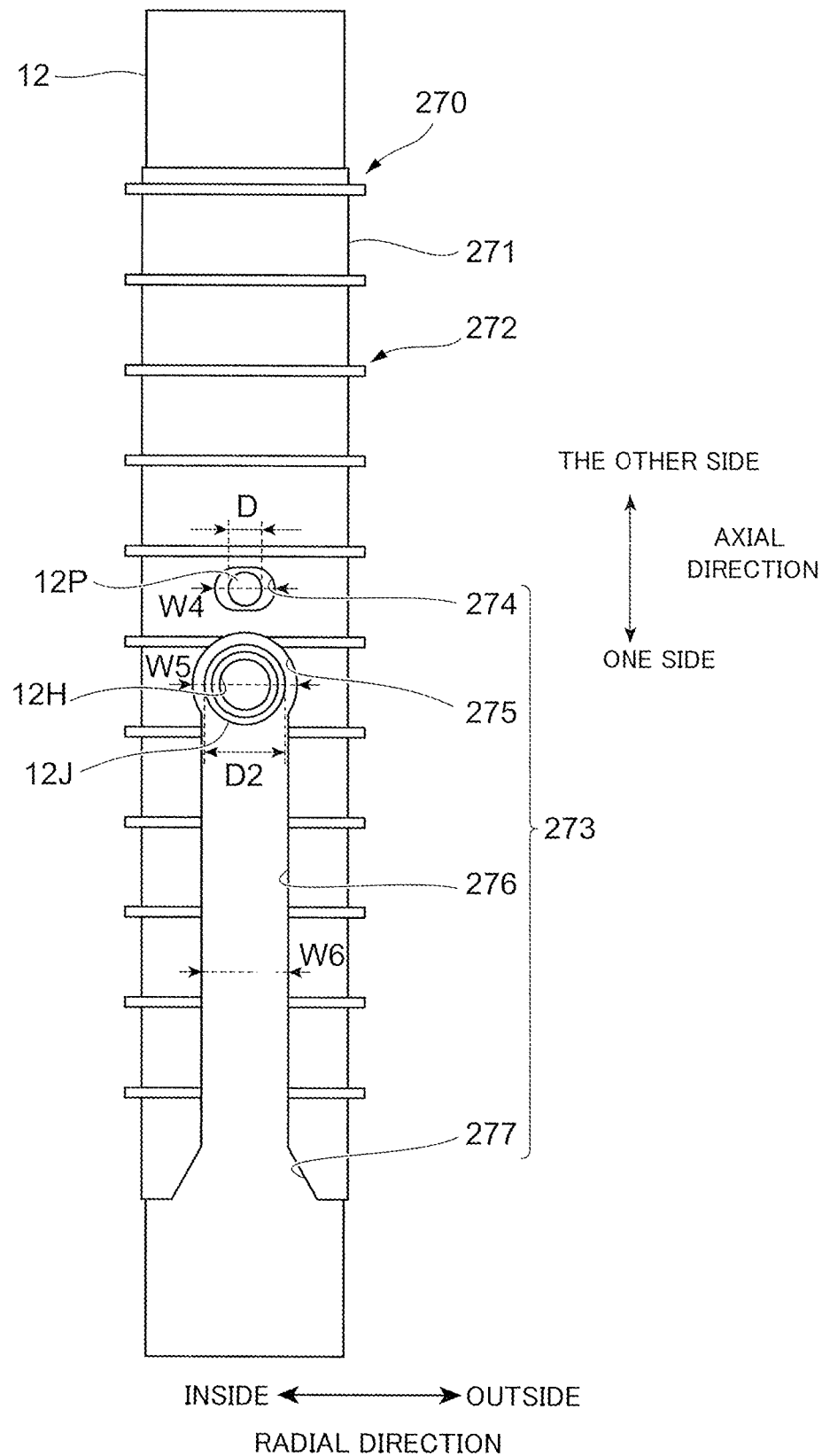
FIG. 6 is an explanatory diagram of a baffle member of the third embodiment.

FIG. 6 is an explanatory diagram of a baffle member 270 of the third embodiment.

An explanation will be given of the hydraulic damper 1 of the third embodiment. A difference of the hydraulic damper 1 of the third embodiment from those of the other embodiments lies in the structure of the baffle member 270.

In the explanation of the third embodiment, similar components to those in the other embodiments are denoted by the same reference numerals, and detailed description thereof will be omitted.

As shown in FIG. 6, the baffle member 270 (an example of the disturbance prevention member) includes a main body 271, a disturbance prevention part 272 on the outer surface of the main body 271, and a held part 273 formed at the one side.

Basic structures of the main body 271 and the disturbance prevention part 272 are the same as those of the main body 71 and the disturbance prevention part 72 of the second embodiment, respectively.

Held Part 273

The held part 273 includes an opening 274, a second opening 275 at the one side of the opening 274, a straight part 276 at the one side of the second opening 275, and a guide part 277 at the one side of the straight part 276.

The opening 274 is a substantially round opening. The opening 274 has a circumferential width W4 that is slightly larger than the outer diameter D of the holding part 12P. In the state where the baffle member 270 is attached to the outer cylinder body 12, the opening 274 restricts the baffle member 270 from moving to both the one side and the other side in the axial direction.

In the third embodiment, the opening 274 further restricts the circumferential movement of the baffle member 270 within a certain range.

The second opening 275 is a substantially round opening. The second opening 275 has a circumferential width W5 that is slightly larger than the outer diameter D2 of the solenoid connecting part 12J.

The straight part 276 is a groove extending in the axial direction. The straight part 276 has a circumferential width W6 that is substantially equal to the width of the solenoid connecting part 12J. When the baffle member 270 is attached to the outer cylinder body 12, the straight part 276 allows the baffle member 270 to be inserted to the one side (lower side) past the solenoid connecting part 12J.

The guide part 277 has a tapered shape. In other words, the guide part 277 is opened so that its width gradually narrows toward the straight part 276. The guide part 277 guides the straight part 276 toward the solenoid connecting part 12J to fit the second opening 275 into the solenoid connecting part 12J.

With the above configuration, the baffle member 270 can be positioned by the held part 273, for example. Thus, the baffle member 270 of the third embodiment reliably prevents ruffle of the liquid surface, which, in turn, prevents mixing of bubbles in the liquid.

Fourth Embodiment

Figure 7A:
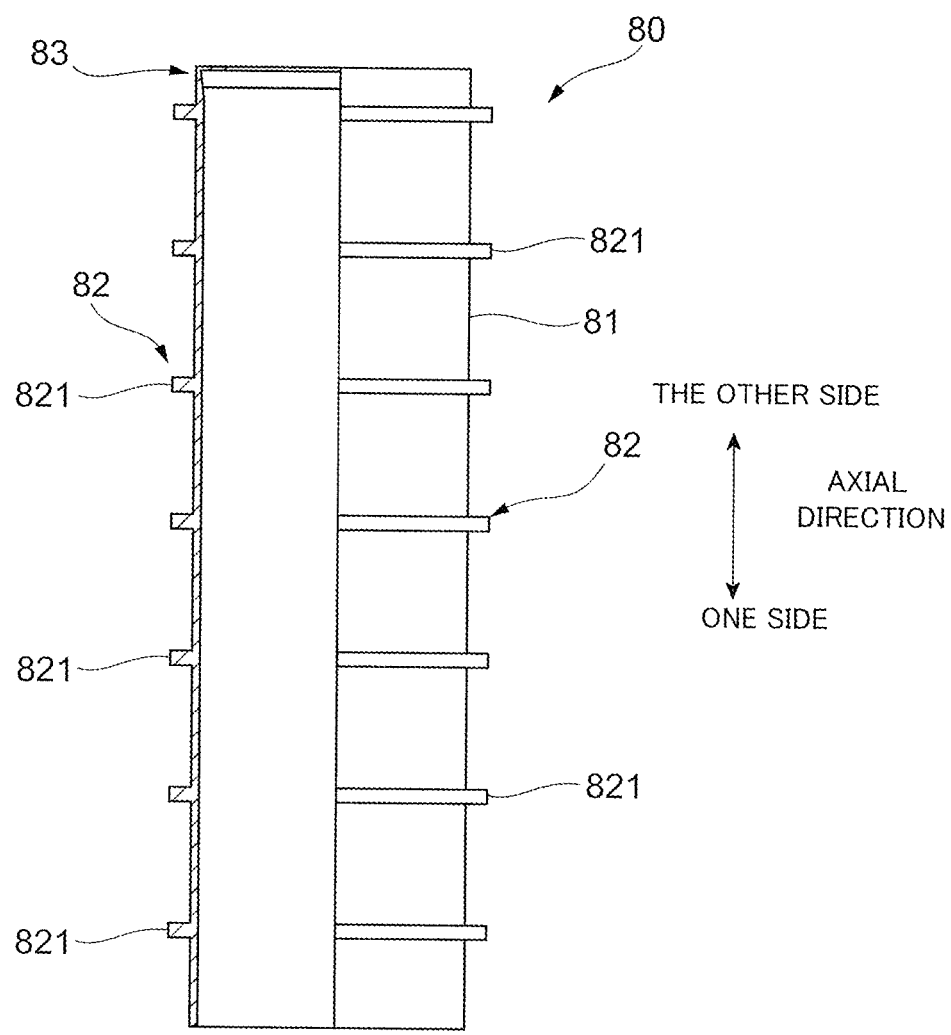
FIGS. 7A and 7B are explanatory diagrams of a baffle member of the fourth embodiment.
Figure 7B:
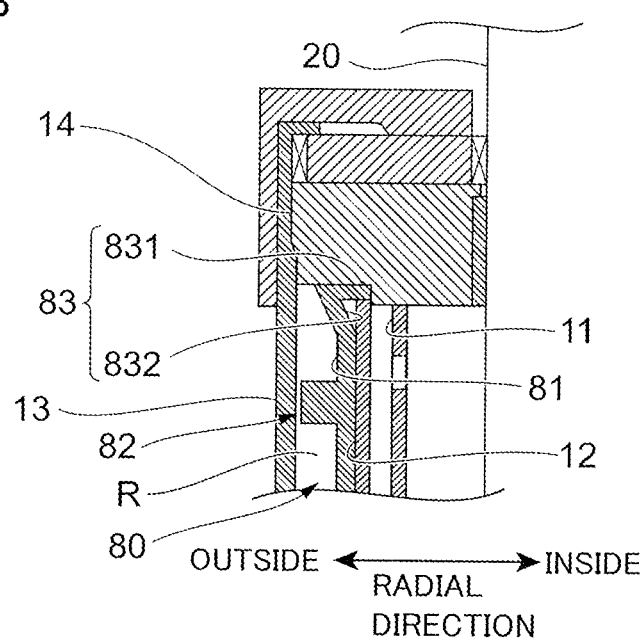

FIGS. 7A and 7B are explanatory diagrams of a baffle member 80 of the fourth embodiment.

An explanation will be given of the hydraulic damper 1 of the fourth embodiment. A difference of the hydraulic damper 1 of the fourth embodiment from those of the other embodiments lies in the structure of the baffle member 80.

In the explanation of the fourth embodiment, similar components to those in the other embodiments are denoted by the same reference numerals, and detailed description thereof will be omitted.

As shown in FIG. 7A, the baffle member 80 (an example of the disturbance prevention member) includes a main body 81, a disturbance prevention part 82 on the outer surface of the main body 81, and a held part 83 (an example of the restricting part) formed at the other side.

The baffle member 80 of the fourth embodiment is attached to the other side end of the outer cylinder body 12 in a suspended manner.

Main Body 81

As shown in FIG. 7B, the main body 81 has an inner diameter that is substantially equal to the outer diameter of the outer cylinder body 12. Also, the main body 81 has an outer diameter that is smaller than the inner diameter of the damper case 13.

Further, the main body 81 includes a slit (not shown in the figure) extending in the axial direction. The basic structure of the slit is the same as that of the slit 61S of the first embodiment. The slit divides the main body 81 in the circumferential direction of the main body 81.

Disturbance Prevention Part 82

As shown in FIG. 7A, the disturbance prevention part 82 includes multiple protrusions 821 that protrude from the outer surface of the main body 81 to the outside in the radial direction. The disturbance prevention part 82 prevents ruffle of the oil surface within the reservoir chamber R.

The basic structure of the disturbance prevention part 82 is the same as that of the disturbance prevention part 62 (protrusions 621) of the first embodiment.

Held Part 83

As shown in FIG. 7B, the held part 83 includes an internal protrusion 831 at the other side end thereof and a retraction part 832 at the one side of the internal protrusion 831.

The internal protrusion 831 protrudes to the inside in the radial direction. The internal protrusion 831 is positioned in between the rod guide 14 and the outer cylinder body 12 in the axial direction. In the present embodiment, the internal protrusion 831 is interposed between the one side end of the rod guide 14 (an example of the opposed member) and the other side end of the outer cylinder body 12.

In the fourth embodiment, the internal protrusion 831 restricts the baffle member 80 from moving to both the one side and the other side in the axial direction.

At the one side of the internal protrusion 831, the retraction part 832 defines a part whose diameter widens to the outside in the radial direction. The retraction part 832 allows the internal protrusion 831 to extend linearly to the inside in the radial direction. Without the retraction part 832, the internal protrusion 831 may be obliquely inclined for manufacturing reasons. To prevent this, in the fourth embodiment, the retraction part 832 is provided to ensure that the retraction part 832 extends in a direction perpendicular to the axial direction.

With the above configuration, the baffle member 80 can be positioned by the held part 83, for example. Thus, the baffle member 80 of the fourth embodiment reliably prevents ruffle of the liquid surface, which, in turn, prevents mixing of bubbles in the liquid.

Fifth Embodiment

Figure 8A:
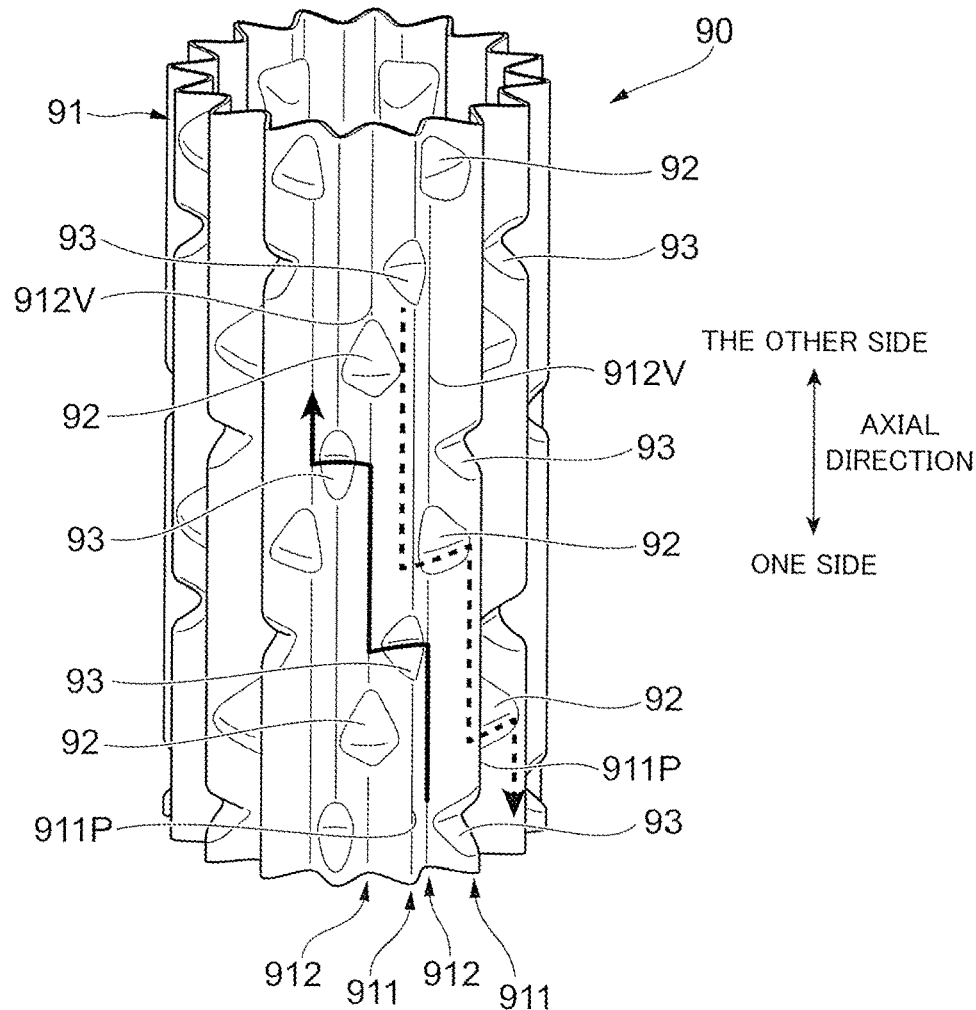
FIGS. 8A and 8B are explanatory diagrams of a baffle member of the fifth embodiment.
Figure 8B:
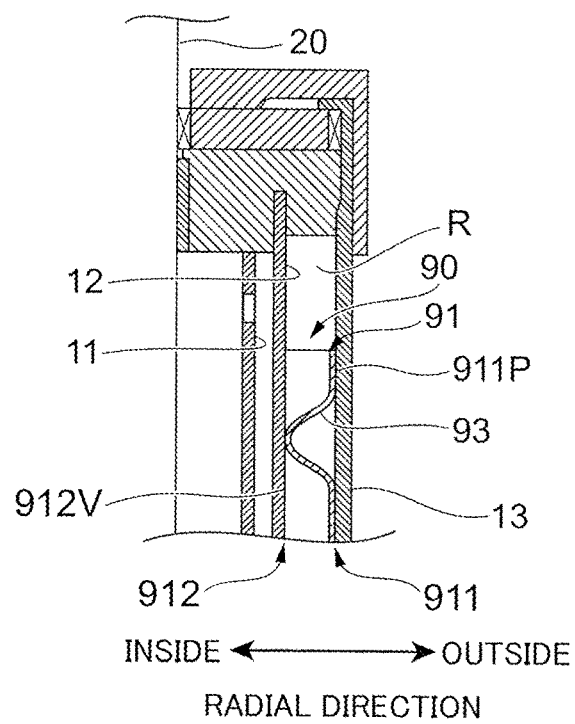

FIGS. 8A and 8B are explanatory diagrams of the hydraulic damper 1 of the fifth embodiment.

An explanation will be given of the hydraulic damper 1 of the fifth embodiment. A difference of the hydraulic damper 1 of the fifth embodiment from those of the other embodiments lies in the structure of the baffle member 90.

In the explanation of the fifth embodiment, similar components to those in the other embodiments are denoted by the same reference numerals, and detailed description thereof will be omitted.

As shown in FIG. 8A, the baffle member 90 (an example of the disturbance prevention member) includes a main body 91, projections 92 on the main body 91, and recesses 93 on the main body 91.

Main Body 91

When taken along the direction perpendicular to the axial direction, the main body 91 has a star-shaped cross section. The main body 91 includes crests 911 protruding to the outside in the radial direction, and troughs 912 protruding to the inside in the radial direction so as to sink from the outside in the radial direction. Each crest 911 has a ridge line 911P extending in the axial direction. Each trough 912 has a trough line 912V extending in the axial direction. The multiple crests 911 and troughs 912 are alternately arranged in the circumferential direction of the main body 91.

In the fifth embodiment, each crest 911 (an example of the inside channel) of the baffle member 90 forms an oil passage at the cylinder 11 side. Also, each trough 912 (an example of the outside channel) of the baffle member 90 forms an oil passage at the opposite side from the cylinder 11.

Further, as shown in FIG. 8B, the ridge line 911P of each crest 911 contacts the inner surface of the damper case 13. The trough line 912V of each trough 912 contacts the outer surface of the outer cylinder body 12. Accordingly, the baffle member 90 is attached to the outer cylinder body 12 such that the main body 91 is held between the outer cylinder body 12 and the damper case 13. Thus, the main body 91 of the baffle member 90 is restricted from moving to both the one side and the other side in the axial direction.

The projections 92 protrude from the troughs 912 to the other side in the radial direction. The height of each projection 92 is substantially flush with the ridge line 911P of each crest 911. When viewed from the inside in the radial direction of the baffle member 90, the projections 92 are shaped so as sink to the outside in the radial direction.

The recesses 93 sink from the crests 911 to the inside in the radial direction. The bottom of each recess 93 is substantially flush with the trough line 912V of each trough 912. When viewed from the inside in the radial direction of the baffle member 90, the recesses 93 are shaped so as to protrude to the inside in the radial direction.

An explanation will be given of oil flow in the baffle member 90 of the fifth embodiment.

The solid arrow in FIG. 8A represents oil flow at the outside in the radial direction of the baffle member 90. Specifically, axial flow of oil at the outside in the radial direction of the trough 912 is restricted by the projection 92. This causes the oil to flow in the circumferential direction along the recess 93 into the adjacent trough 912. In this way, the oil is restricted from flowing smoothly in the axial direction at the outside in the radial direction of the baffle member 90, and this prevents ruffle of the liquid surface.

The dashed arrow in FIG. 8A represents oil flow at the inside in the radial direction of the baffle member 90. Specifically, axial flow of oil at the inside in the radial direction of the crest 911 is restricted by the recess 93. This causes the oil to flow in the circumferential direction along the projection 92 into the adjacent crest 911. In this way, the oil is also restricted from moving smoothly in the axial direction at the inside in the radial direction of the baffle member 90, and this prevents ruffle of the liquid surface.

With the above configuration, the baffle member 90 can be positioned by, for example, the main body 91 itself being held between the outer cylinder body 12 and the damper case 13 in the radial direction. Thus, the baffle member 90 of the fifth embodiment reliably prevents ruffle of the liquid surface, which, in turn, prevents mixing of bubbles in the liquid.

In order to more tightly restrict movement of the baffle member 90 in the axial direction, the baffle member 90 of the fifth embodiment may further include, for example, the first opening 631 and the first neck part 632 of the first embodiment. Also, in order to more tightly restrict movement of the baffle member 90 in the axial direction, the baffle member 90 of the fifth embodiment may further include, for example, the internal protrusion 831 of the fourth embodiment protruding to the inside in the radial direction.

In the above embodiments, the oil chambers (the first oil chamber Y1 and the second oil chamber Y2), the reservoir chamber R, and the communication path L are formed by a so-called triple tube structure, which consists of the cylinder 11, the outer cylinder body 12, and the damper case 13, each being cylindrical. However, these chambers and path are not necessarily formed by the triple tube structure. For example, the baffle member of any of the first to the fifth embodiments may be used in a so-called double tube structure consisting of the cylinder 11 and the damper case 13.

REFERENCE SIGNS LIST

1 Hydraulic damper
11 Cylinder (an example of the first cylinder)
12 Outer cylinder body 12 (an example of the second cylinder)
13 Damper case (an example of the third cylinder)
30 Piston unit (an example of the partitioning unit)
40 Bottom valve unit
50 Damping force changer
60 (70, 80, 90, 270) Baffle member (an example of the disturbance prevention part)
L Communication path
R Reservoir chamber (an example of the liquid chamber)

The invention claimed is:

1. A hydraulic damping device comprising:
   a cylinder unit storing liquid;
   a liquid reservoir outside the cylinder unit, the liquid reservoir retaining liquid;
   a partitioning unit configured to move in an axial direction inside the cylinder unit, the partitioning unit partitioning a space inside the cylinder unit into a first oil chamber and a second oil chamber each storing liquid;
   a disturbance prevention member separate from the cylinder unit and configured to be attached to the cylinder unit, the disturbance prevention member including a main body located in the liquid reservoir and a protrusion protruding from the main body, the disturbance prevention member being configured to prevent disturbance of a liquid surface of liquid within the liquid reservoir;
   a damping force generator at an outside of the cylinder unit in a radial direction, the damping force generator being configured to permit flow of liquid between the damping force generator and the cylinder unit via a connecting part, the damping force generator being configured to generate a damping force by imparting resistance to flow of the liquid that results from the partitioning unit moving in the axial direction;
   a cylinder protrusion at a different position on the cylinder unit different from the connecting part, the cylinder protrusion protruding from the cylinder unit in the radial direction;
   a restricting part provided to the disturbance prevention member, the restricting part including a held part held by the cylinder protrusion, the restricting part being configured to restrict the disturbance prevention member from moving to both one side and the other side in the axial direction; and
   a deformation permission part configured to permit deformation of the held part when the disturbance prevention member is attached to the cylinder unit.

2. The hydraulic damping device according to claim 1, wherein the held part includes an open end at the one side in the axial direction and a closed end at the other side in the axial direction, and includes an opening surrounding the cylinder protrusion.

3. The hydraulic damping device according to claim 2, wherein the held part includes a guide part, the guide part having an opening width decreasing toward the opening, the guide part being configured to guide the held part toward the cylinder protrusion when the disturbance prevention member is attached to the cylinder unit.

4. The hydraulic damping device according to claim 2, wherein the opening includes:
   a first part having an opening width larger than a width of the cylinder protrusion; and
   a second part at the one side relative to the first part, the second part having an opening width smaller than the opening width of the first part.

* * * * *